UNITED STATES PATENT OFFICE.

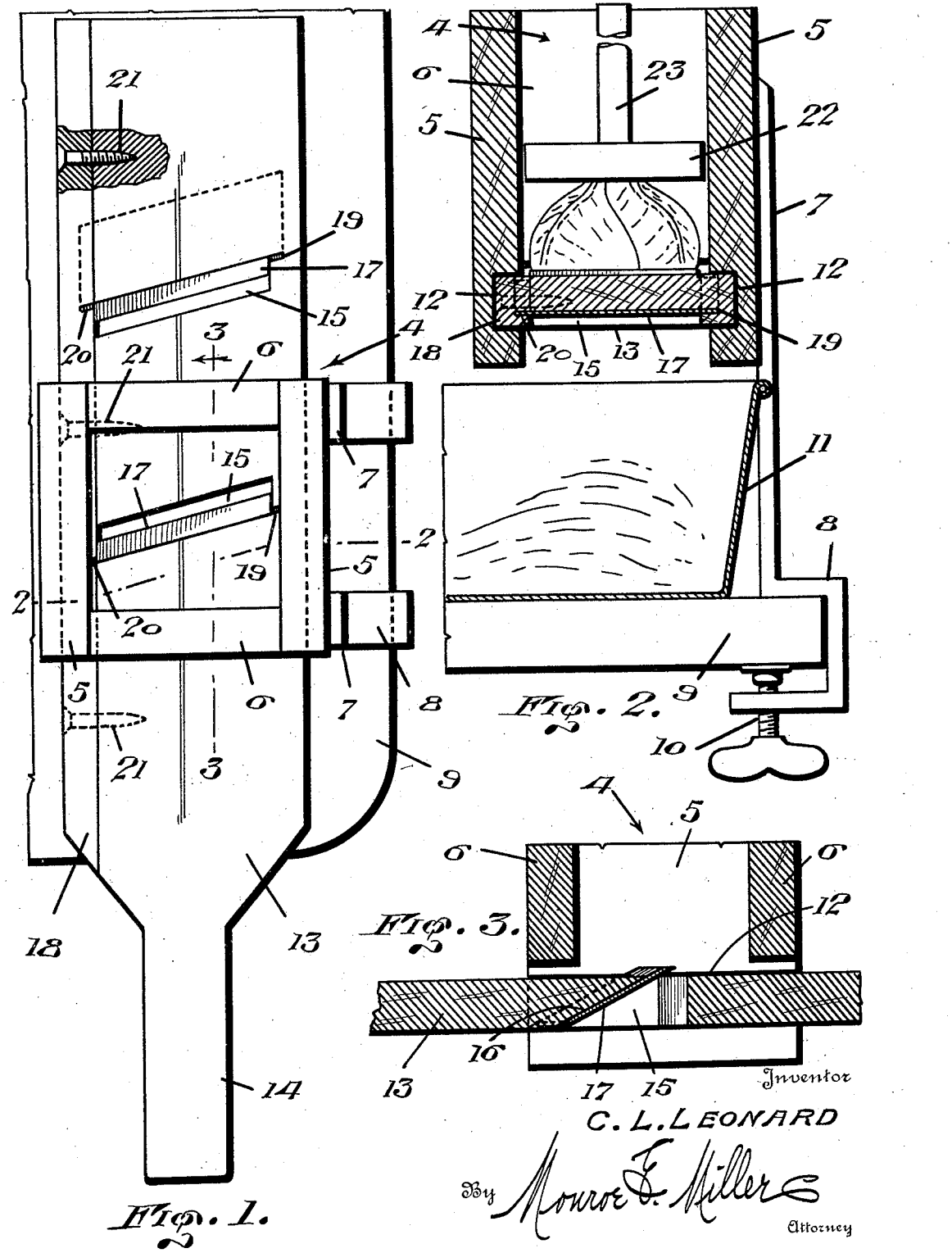

CASWELL LEE LEONARD, OF CORINTH, MISSISSIPPI.

VEGETABLE AND FRUIT SLICER.

1,402,777.

Specification of Letters Patent. Patented Jan. 10, 1922.

Application filed February 27, 1920. Serial No. 361,613.

*To all whom it may concern:*

Be it known that I, CASWELL LEE LEONARD, citizen of the United States, residing at Corinth, in the county of Alcorn and State of Mississippi, have invented certain new and useful Improvements in Vegetable and Fruit Slicers, of which the following is a specification, reference being had therein to the accompanying drawing.

This invention relates to devices for slicing vegetables, fruit and the like, and aims to provide a novel and improved slicer which can be conveniently used in the kitchen, and which can be inexpensively manufactured.

Another object of the invention is the provision of a hopper or receptacle for fruit for the action of the slicing slide and means for supporting said hopper or receptacle from the edge of a table, so that a pan, dish or other receptacle can be placed under the hopper to receive the sliced material as it drops from the hopper.

A further object is the provision of a novel and improved slicing slide having novel and improved yet simple and effective means for holding the cutter blades, whereby they can be conveniently loosened for removal or adjustment, said blades being preferably reversely inclined so as to slice the material during both movements of the slide when reciprocated.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawing, wherein:—

Figure 1 is a plan view of the improved slicer, portions being shown in section.

Fig. 2 is a vertical section thereof taken on the line 2—2 of Fig. 1, and showing the presser head used for finishing the work to avoid the possible cutting of the fingers.

Fig. 3 is a sectional detail taken on the line 3—3 of Fig. 1.

In carrying out the invention, there is provided a hopper or receptacle 4 to receive the material which is to be sliced, and composed of the opposite side walls 5 between which the other opposite side walls 6 are secured, said hopper being conveniently made from wood, or other suitable material and of any desired size. Supporting posts 7 are secured to one wall 5 and have feet 8 at their lower ends bent to rest on the edge portion of a table 9 or other supporting member, and to engage around and under such edge portion, said feet carrying screws 10 to bear upwardly against the portion of the table for clamping the posts thereon whereby to support the hopper above the table so that a pan, dish or other receptacle 11 can be placed on the table underneath the hopper 4 to receive the sliced material.

The walls 5 extend downwardly below the lower ends of the walls 6, and the downwardly extended portions thereof are provided at their inner sides with horizontal complementary grooves 12 slidably receiving the edge portions of the slicing slide 13. This slide 13 can be conveniently made of wood or equivalent material and is disposed in a horizontal position, having a handle 14 at one end for reciprocating said slide within the lower portion of the hopper. The slide 15 has oblique openings 15, each of which has one wall inclined, as at 16, and the cutter blades 17 bear upwardly against said walls 16 so as to be disposed in an inclined oblique position with their upper cutting edges projecting above the upper surface of the slide, and the lower ends of the walls 6 are spaced above grooves 12 to allow a clearance for the passage of the cutting edges of the blades.

In order to secure the cutting blades in place, the slide 13 is provided along one edge thereof with a clamping bar 18 that extends across the open ends of the openings 15, it being noted that when the bar 18 is removed, said openings 15 are open at one end, whereby they can be conveniently cut in the wood during the manufacture of the slide 15. The slide is provided at the closed ends of the openings 16 with inclined slots 19 along the corresponding ends of the walls 16 and the bar 18 is similarly provided with inclined slots 20, said slots 19 and 20 receiving the ends of the blades 17 whereby to support them within the openings 15. The bar 18 is secured to the slide 13 by means of screws 21 or the like, located at opposite sides of the blades, and by thus clamping the bar 18 to the slide, it will clamp the blades 17 between said bar and the opposite ends of the openings 15. In other words, the ends of the blades are tightly seated in the slots or grooves 19 and 20, and by loosening the screws the blades are loosened so that they can be adjusted to regulate the thickness of the slices cut, or the blades can be removed for sharpening.

In using the slicer, the head of cabbage, apple or other article to be sliced is placed in the hopper, and the slide 13 is then reciprocated so that the cutter blades 17 will slice the object during each stroke of the slide, one cutter blade moving into the hopper as the other is withdrawn. In finishing up, instead of pressing the object down in the hopper by the fingers, with the possibility of cutting the fingers, a presser head 22 is used, being provided with an upwardly extending handle 23. Said head is moved into the hopper and pushed down by means of a handle 23, thereby enabling the slicing to be completed conveniently without possible injury to the hand. The device can be used for domestic purposes generally, slicing vegetables, fruit and the like, and the slide 13 can be withdrawn, enabling the hopper and slide to be thoroughly cleaned to render the device sanitary.

Having thus described the invention, what is claimed as new is:

A slicer comprising a hopper having opposite side walls extending below the other side walls, the extending portions of the first named side walls having grooves and the lower ends of the second named side walls being spaced above said grooves, a slide having an opening extending to one edge thereof, a bar extending along said edge of the slide across one end of the opening, said bar being slidable in one of said grooves and the opposite edge of the slide being movable in the other groove, the slide having a slot at the opposite end of the opening and the bar having a corresponding slot, a cutter blade in the said opening of the slide having its ends seated in said slots to support the blade in said opening with its upper edge projecting above the slide to work in the hopper, and means clamping said bar to the slide to clamp the cutter blade.

In testimony whereof, I hereunto affix my signature.

CASWELL LEE LEONARD.